US011978254B2

(12) United States Patent
Hall

(10) Patent No.: US 11,978,254 B2
(45) Date of Patent: *May 7, 2024

(54) SYSTEMS AND METHODS FOR PROVIDING VIDEO PRESENTATION AND VIDEO ANALYTICS FOR LIVE SPORTING EVENTS

(71) Applicant: SportsMEDIA Technology Corporation, Durham, NC (US)

(72) Inventor: Gerard J. Hall, Durham, NC (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,835

(22) Filed: Mar. 22, 2023

(65) Prior Publication Data

US 2023/0222791 A1 Jul. 13, 2023

Related U.S. Application Data

(63) Continuation of application No. 17/089,314, filed on Nov. 4, 2020, now Pat. No. 11,615,617, which is a continuation of application No. 16/262,322, filed on Jan. 30, 2019, now Pat. No. 10,832,055.

(60) Provisional application No. 62/624,534, filed on Jan. 31, 2018.

(51) Int. Cl.
| | | |
|---|---|---|
| *G06K 9/00* | (2022.01) | |
| *G06T 7/20* | (2017.01) | |
| *G06T 17/00* | (2006.01) | |
| *G06V 20/20* | (2022.01) | |
| *G06V 20/40* | (2022.01) | |
| *H04N 21/2187* | (2011.01) | |
| *H04N 21/234* | (2011.01) | |
| *H04N 21/81* | (2011.01) | |
| *H04N 23/90* | (2023.01) | |

(52) U.S. Cl.
CPC ............. *G06V 20/20* (2022.01); *G06T 7/20* (2013.01); *G06T 17/00* (2013.01); *G06V 20/42* (2022.01); *H04N 21/2187* (2013.01); *H04N 21/23418* (2013.01); *H04N 21/8146* (2013.01); *H04N 23/90* (2023.01); *G06T 2207/30241* (2013.01); *G06T 2210/21* (2013.01)

(58) Field of Classification Search
CPC ...................................................... G06V 20/42
See application file for complete search history.

(56) References Cited

U.S. PATENT DOCUMENTS

| | | |
|---|---|---|
| 5,917,553 A | 6/1999 | Honey et al. |
| 6,133,946 A | 10/2000 | Cavallaro et al. |
| 6,141,060 A | 10/2000 | Honey et al. |

(Continued)

*Primary Examiner* — Hadi Akhavannik
(74) *Attorney, Agent, or Firm* — NEO IP

(57) ABSTRACT

Systems and methods for video presentation and analytics for live sporting events are disclosed. At least two cameras are used for tracking objects during a live sporting event and generate video feeds to a server processor. The server processor is operable to match the video feeds and create a 3D model of the world based on the video feeds from the at least two cameras. 2D graphics are created from different perspectives based on the 3D model. Statistical data and analytical data related to object movement are produced and displayed on the 2D graphics. The present invention also provides a standard file format for object movement in space over a timeline across multiple sports.

19 Claims, 17 Drawing Sheets

(56) References Cited

U.S. PATENT DOCUMENTS

| | | |
|---|---|---|
| 6,266,100 B1 | 7/2001 | Gloudemans et al. |
| 6,292,130 B1 | 9/2001 | Cavallaro et al. |
| 6,304,665 B1 | 10/2001 | Cavallaro et al. |
| 6,456,232 B1 | 9/2002 | Milnes et al. |
| 7,075,556 B1 | 7/2006 | Meier et al. |
| 7,138,963 B2 | 11/2006 | Hobgood et al. |
| 7,154,540 B2 | 12/2006 | Honey et al. |
| 7,341,530 B2 | 3/2008 | Cavallaro et al. |
| 7,492,363 B2 | 2/2009 | Meier et al. |
| 7,552,031 B2 | 6/2009 | Vock et al. |
| 7,627,451 B2 | 12/2009 | Vock et al. |
| 7,750,901 B2 | 7/2010 | Meier et al. |
| 7,928,976 B2 | 4/2011 | Meier et al. |
| 8,077,981 B2 | 12/2011 | Elangovan et al. |
| 8,079,247 B2 | 12/2011 | Russell et al. |
| 8,253,799 B2 | 8/2012 | Elangovan et al. |
| 8,279,286 B2 | 10/2012 | Wagg et al. |
| 8,289,185 B2 | 10/2012 | Alonso |
| 8,315,432 B2 | 11/2012 | Lefevre et al. |
| 8,335,345 B2 | 12/2012 | White et al. |
| 8,400,302 B2 | 3/2013 | Russell et al. |
| 8,456,526 B2 | 6/2013 | Gloudemans et al. |
| 8,466,794 B2 | 6/2013 | Mack et al. |
| 8,477,046 B2 | 7/2013 | Alonso |
| 8,482,612 B2 | 7/2013 | Tamir et al. |
| 8,558,883 B2 | 10/2013 | Cavallaro et al. |
| 8,705,799 B2 | 4/2014 | White et al. |
| 8,786,415 B2 | 7/2014 | Cavallaro et al. |
| 8,860,570 B2 | 10/2014 | Thomas et al. |
| 8,884,741 B2 | 11/2014 | Cavallaro et al. |
| 8,989,880 B2 | 3/2015 | Wohl et al. |
| 9,014,830 B2 | 4/2015 | Wohl |
| 9,035,776 B2 | 5/2015 | Robert |
| 9,044,198 B2 | 6/2015 | Benzel et al. |
| 9,058,670 B2 | 6/2015 | Birenboim et al. |
| 9,076,041 B2 | 7/2015 | Bentley et al. |
| 9,094,615 B2 | 7/2015 | Aman et al. |
| 9,180,357 B2 | 11/2015 | Richley |
| 9,220,444 B2 | 12/2015 | Russell |
| 9,235,765 B2 | 1/2016 | Bentley et al. |
| 9,247,212 B2 | 1/2016 | Bose et al. |
| 9,406,131 B2 | 8/2016 | Würmlin et al. |
| 9,625,321 B2 | 4/2017 | Cavallaro et al. |
| 9,842,434 B2 * | 12/2017 | Jiang ................... G06T 19/006 |
| 9,846,805 B2 | 12/2017 | Painter |
| 10,412,440 B2 | 9/2019 | Paul et al. |
| 10,832,055 B2 * | 11/2020 | Hall ..................... G06V 20/20 |
| 11,083,954 B2 | 8/2021 | Sexton et al. |
| 2003/0182620 A1 | 9/2003 | Errico et al. |
| 2007/0121425 A1 | 5/2007 | Eble et al. |
| 2008/0192116 A1 | 8/2008 | Tamir et al. |
| 2009/0128549 A1 * | 5/2009 | Gloudemans ........... G06T 15/20 345/419 |
| 2009/0128577 A1 * | 5/2009 | Gloudemans ........ H04N 23/661 348/46 |
| 2009/0210395 A1 | 8/2009 | Sedam |
| 2010/0026809 A1 | 2/2010 | Curry |
| 2011/0090344 A1 * | 4/2011 | Gefen .................... H04N 23/60 348/169 |
| 2011/0169959 A1 * | 7/2011 | DeAngelis ................ G06T 7/70 348/157 |
| 2011/0238853 A1 | 9/2011 | Paul et al. |
| 2011/0304497 A1 | 12/2011 | Molyneux et al. |
| 2012/0139731 A1 | 6/2012 | Razoumov et al. |
| 2012/0154593 A1 * | 6/2012 | Anderson .............. H04N 23/00 348/157 |
| 2012/0326873 A1 | 12/2012 | Utter |
| 2014/0219550 A1 * | 8/2014 | Popa ..................... G06V 20/42 382/154 |
| 2014/0300733 A1 * | 10/2014 | Mitchell ................ G06V 20/20 348/135 |
| 2014/0310243 A1 | 10/2014 | McGee et al. |
| 2015/0040685 A1 | 2/2015 | Nicholson et al. |
| 2015/0097700 A1 | 4/2015 | Holthouse |
| 2015/0131845 A1 | 5/2015 | Forouhar et al. |
| 2015/0148129 A1 | 5/2015 | Austerlade et al. |
| 2015/0149837 A1 | 5/2015 | Alonso et al. |
| 2015/0206409 A1 | 7/2015 | Visvanathan et al. |
| 2015/0208044 A1 | 7/2015 | Jacobson et al. |
| 2015/0248917 A1 * | 9/2015 | Chang .................. G11B 27/031 386/282 |
| 2015/0306486 A1 | 10/2015 | Logan et al. |
| 2015/0317801 A1 | 11/2015 | Bentley et al. |
| 2015/0356332 A1 | 12/2015 | Turner et al. |
| 2015/0375083 A1 | 12/2015 | Stelfox et al. |
| 2015/0381947 A1 * | 12/2015 | Renkis ................... G06V 20/52 348/159 |
| 2016/0232685 A1 * | 8/2016 | Hefetz ...................... G06T 7/90 |
| 2016/0314818 A1 | 10/2016 | Kirk et al. |
| 2016/0320941 A1 | 11/2016 | McQuistan et al. |
| 2016/0335505 A1 * | 11/2016 | Renkis ................... H04L 67/10 |
| 2017/0090554 A1 | 3/2017 | Pececnik |
| 2017/0098331 A1 * | 4/2017 | Jiang ........................ G06T 7/20 |
| 2017/0140629 A1 | 5/2017 | Briggs et al. |
| 2017/0172222 A1 | 6/2017 | Morgenthau et al. |
| 2017/0187704 A1 | 6/2017 | Agnew et al. |
| 2017/0201779 A1 | 7/2017 | Publicover et al. |
| 2017/0219707 A1 | 8/2017 | Cavallaro et al. |
| 2017/0224214 A1 | 8/2017 | Saigh et al. |
| 2017/0238055 A1 | 8/2017 | Chang et al. |
| 2017/0259115 A1 * | 9/2017 | Hall ........................ G16H 40/67 |
| 2018/0077345 A1 * | 3/2018 | Yee ......................... H04N 23/69 |
| 2018/0129865 A1 * | 5/2018 | Zia ......................... G06T 15/40 |
| 2019/0030397 A1 | 1/2019 | Hall |
| 2019/0236364 A1 | 8/2019 | Hall |
| 2020/0070002 A1 | 3/2020 | Hall |
| 2021/0073546 A1 | 3/2021 | Hall |

\* cited by examiner

SYSTEMS AND METHODS FOR PROVIDING VIDEO PRESENTATION AND VIDEO ANALYTICS FOR LIVE SPORTING EVENTS

CROSS-REFERENCES TO RELATED APPLICATIONS

The application is related to and claims priority from the following U.S. patent documents: this application is a continuation of U.S. patent application Ser. No. 17/089,314, filed Nov. 4, 2020, which is a continuation of U.S. patent application Ser. No. 16/262,322, filed Jan. 30, 2019 and issued as U.S. Pat. No. 10,832,055, which claims priority to and the benefit of U.S. Provisional Patent Application No. 62/624,534, filed Jan. 31, 2018, each of which is incorporated herein by reference in its entirety.

BACKGROUND OF THE INVENTION

1. Field of the Invention

The present invention relates to systems and methods for providing video presentation and video analytics for live sporting events. More particularly, for providing movement data of an object in a live sporting event based on video processing.

2. Description of the Prior Art

Exemplary US Patent Documents relevant to the prior art include:

U.S. Pat. No. 9,094,615 for "Automatic event videoing, tracking and content generation" by James A. Aman et al., filed Apr. 18, 2005 and issued Jul. 28, 2015, describes an automatics system 100 that uses one to three grids 20 cm of overhead cameras 20c to first video an event area 2. Overall bandwidth is greatly reduced by intelligent hubs 26 that extract foreground blocks 10m based upon initial and continuously updated background images 2r. The hubs also analyze current images 10c to constantly locate, classify and track in 3D the limited number of expected foreground objects 10. As objects 10 of interest are tracked, the system automatically directs ptz perspective view cameras 40c to follow the activities. These asynchronous cameras 40c limit their images to defined repeatable pt angles and zoom depths. Pre-captured venue backgrounds 2r at each repeatable ptz setting facilitate perspective foreground extraction. The moving background, such as spectators 13, is removed with various techniques including stereoscopic side cameras 40c-b and 40c-c flanking each perspective camera 40c. The tracking data 101 derived from the overhead view 102 establishes event performance measurement and analysis data 701. The analysis results in statistics and descriptive performance tokens 702 translatable via speech synthesis into audible descriptions of the event activities corresponding to overhead 102 and perspective video 202.

U.S. Pat. No. 9,406,131 for "Method and system for generating a 3D representation of a dynamically changing 3D scene" by Stephan Wurmlin et al., filed on May 24, 2007 and issued on Aug. 2, 2016, describes a method for generating a 3D representation of a dynamically changing 3D scene, which includes the steps of: acquiring at least two synchronised video streams (120) from at least two cameras located at different locations and observing the same 3D scene (102); determining camera parameters, which comprise the orientation and zoom setting, for the at least two cameras (103); tracking the movement of objects (310a,b, 312a,b; 330a,b, 331a,b, 332a,b; 410a,b, 411a,b; 430a,b, 431a,b; 420a,b, 421a,b) in the at least two video streams (104); determining the identity of the objects in the at least two video streams (105); determining the 3D position of the objects by combining the information from the at least two video streams (106); wherein the step of tracking (104) the movement of objects in the at least two video streams uses position information derived from the 3D position of the objects in one or more earlier instants in time. As a result, the quality, speed and robustness of the 2D tracking in the video streams is improved.

U.S. Pat. No. 8,315,432 for "Augmented reality method and devices using a real time automatic tracking of marker-free textured planar geometrical objects in a video stream" by Valentin Lefevre et al., filed Jan. 18, 2008 and issued Nov. 20, 2012, describes a method and devices for the real-time tracking of one or more substantially planar geometrical objects of a real scene in at least two images of a video stream for an augmented-reality application. After receiving a first image of the video stream (300), the first image including the object to be tracked, the position and orientation of the object in the first image are determined from a plurality of previously determined image blocks (320), each image block of said plurality of image blocks being associated with an exposure of the object to be tracked. The first image and the position and the orientation of the object to be tracked in the first image define a key image. After receiving a second image from the video stream, the position and orientation of the object to be tracked in the second image are evaluated from the key image (300). The second image and the corresponding position and orientation of the object to be tracked can be stored as a key image. If the position and the orientation of the object to be tracked cannot be found again in the second image from the key image, the position and the orientation of this object in the second image are determined from the plurality of image blocks and the related exposures (320).

U.S. Pat. No. 8,279,286 for "Apparatus and method of object tracking" by David Wagg et al., filed on Sep. 4, 2008 and issued Oct. 2, 2012, describes a method of extracting image features from objects on a plane within video images; detecting the objects from a relative position on the plane by comparing the extracted image features with sample image features; and generating object identification data identifying the objects on the plane. The method includes generating a 3D model of the plane and logging object identification data and object path data, the object path data including a time history of object position on the 3D model and a path of the objects within the video images. The method also includes detecting an occlusion event indicating whether object features are occluded; associating object identification data with object path data for objects in the occlusion event; identifying one of the objects involved in the occlusion event by comparing the objects image features and the sample image features; and updating the path data after the identification.

U.S. Pat. No. 7,138,963 for "Method for automatically tracking objects in augmented reality" by Andrew W. Hobgood et al., filed on Apr. 16, 2004 and issued Nov. 21, 2006, describes a method for displaying otherwise unseen objects and other data using augmented reality (the mixing of real view with computer generated imagery). The method uses a motorized camera mount that can report the position of a camera on that mount back to a computer. With knowledge of where the camera is looking, and the size of its field of view, the computer can precisely overlay computer-generated imagery onto the video image produced by the camera.

The method may be used to present to a user such items as existing weather conditions, hazards, or other data, and presents this information to the user by combining the computer generated images with the user's real environment. These images are presented in such a way as to display relevant location and properties of the object to the system user. The primary intended applications are as navigation aids for air traffic controllers and pilots in training and operations, and use with emergency first responder training and operations to view and avoid/alleviate hazardous material situations, however the system can be used to display any imagery that needs to correspond to locations in the real world.

US Publication No. 2017.0098331 for "System and method for reproducing objects in 3d scene" by Maoshan Jiang et al., filed on Sep. 24, 2015 and published Apr. 6, 2017, describes a system and a method for reproducing an object in a 3D scene. The system comprises an object acquiring unit configured to simultaneously acquire at least two channels of video stream data in real time at different angles for an object to be displayed; an object recognizing unit configured to recognize a shape of the object varying in real time from the at least two channels of video stream data; an object tracking unit configured to obtain corresponding object motion trajectory according to the shape of the object varying in real time; and an object projecting unit configured to process the shape of the object varying in real time and the corresponding object motion trajectory into a 3D image and superposition-project the 3D image into the 3D scene in real time. The technical solutions of the present disclosure can reproduce the object in the 3D scene, and achieve the purpose of displaying the real object in the 3D scene.

SUMMARY OF THE INVENTION

The present invention provides systems and methods for video presentation and analytics for live sporting events. At least two tracking cameras are used for tracking objects during a live sporting event and generate video feeds to a server processor. The server processor is operable to match the video feeds and create a 3D model of the world based on the video feeds from the at least two tracking cameras. 2D graphics are created from different perspectives based on the 3D model. Statistical data and analytical data related to object movement are produced and displayed on the 2D graphics. The present invention also provides a standard file format for object movement in space over a timeline across multiple sports.

These and other aspects of the present invention will become apparent to those skilled in the art after a reading of the following description of the preferred embodiment when considered with the drawings, as they support the claimed invention.

DETAILED DESCRIPTION

Figure 1:
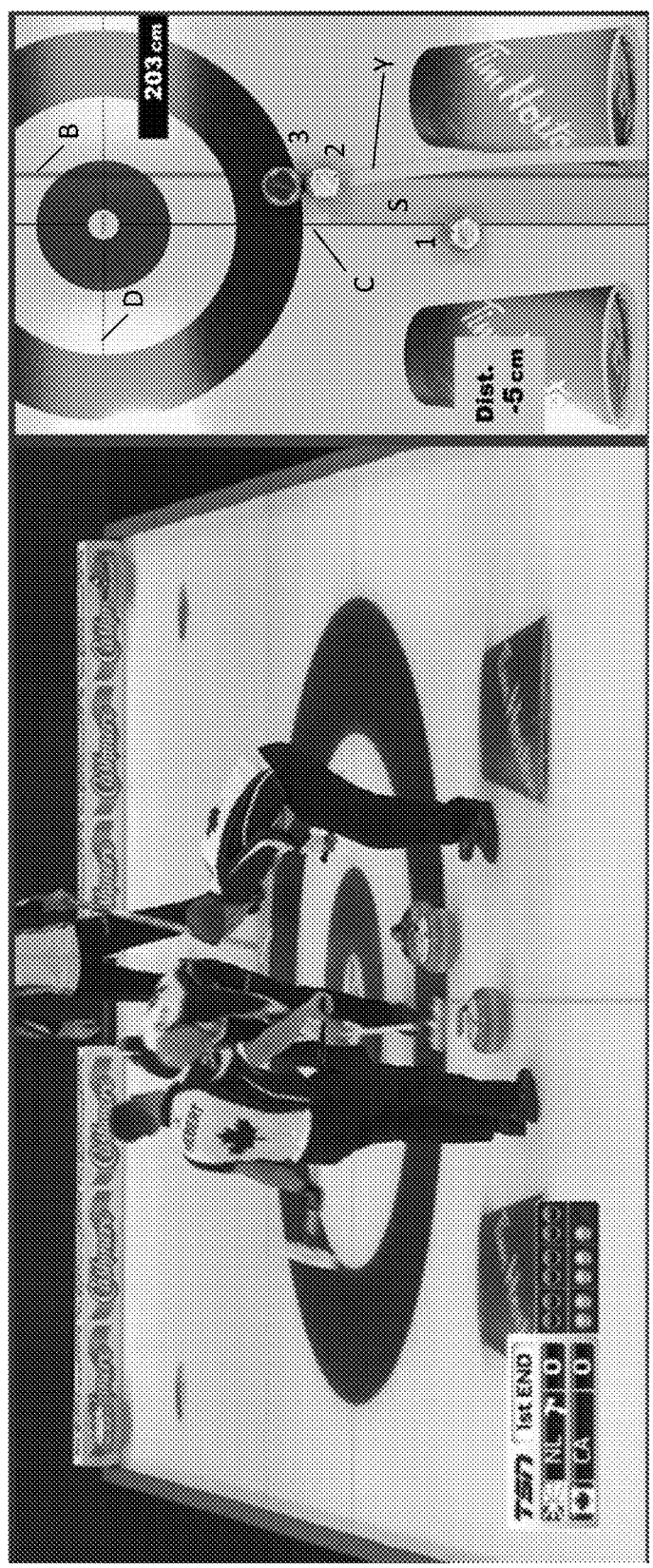
FIG. 1 is a screenshot showing a camera view and a 2D graphic with a top view illustrating a collision in a curling event according to one embodiment of the present invention.

The present invention provides systems and methods for video presentation and analytics for live sporting events. At least two tracking cameras are used for tracking objects during a live sporting event and generate video feeds to a server processor. The server processor is operable to match the video feeds and create a 3D model of the world based on the video feeds from the at least two tracking cameras. 2D graphics are created from different perspectives based on the 3D model. Statistical data and analytical data related to object movement are produced and displayed on the 2D graphics. The present invention also provides a standard file format for object movement in space over a timeline across multiple sports.

In one embodiment of the present invention, the present invention provides systems and methods for video presentation and analytics for curling. In recent years, curling as a sport has gained popularity at regional and international levels. However, the broadcasting of curling events is still lacking video enhancement compared to other sports, for example, baseball, basketball and football. Tracking and statistical data related to curling stone movement are not available for TV broadcasting even at Olympic or world championship level, not to mention for training and coaching. The present invention provides systems and methods for tracking the movement of curling stones and providing various movement data over a timeline. The present invention also provides advanced analytics, predictions and projections, which can be used for training, coaching, strategy developing, betting, and other purposes. The present invention improves viewing experience and viewer engagement, and provides a coaching tool for improving player performance.

The detailed description of the present invention includes camera tracking, video enhancement and telestration, which are described in the following issued patents, by common assignee SportsMedia Technology Corp.: U.S. Pat. Nos. 6,304,665, 6,266,100, 6,292,130, 7,075,556, 7,492,363, 7,750,901, 7,928,976, 6,456,232, 7,341,530, 8,456,526, 8,335,345, 8,705,799, 8,558,883, 5,917,553, 6,141,060, 7,154,540, and 6,133,946, each of which is incorporated by reference herein in its entirety.

In one embodiment of the present invention, two tracking cameras are deployed above a curling sheet. Each tracking camera is configured with pan-tilt-zoom (PTZ) control. Each tracking camera is operable to capture its field of view and produce real-time two-dimensional (2D) video streams. Each tracking camera is configured with a local processor. The 2D video streams from the two tracking cameras are processed in the local processors and fed into a server processor. A three-dimensional (3D) model is created based on the video streams from the two tracking cameras, and the 3D model represents the movement of the curling stones and the curlers and other activities within the curling rink. In one embodiment, the origin of the 3D model is the center of the curling sheet, and the origins of the 2D video streams from the two tracking cameras are at the locations of the two tracking cameras respectively.

In one embodiment, the two tracking cameras cover more than one curling sheet. In another embodiment, more than two tracking cameras are deployed over a curling rink comprising a multicity of curling sheets. The more than two tracking cameras cover all the activities on the multiplicity of curling sheets. For example, four tracking cameras are deployed to cover the whole curling rink. Activities on each curling sheet are captured in an alternate manner.

In one embodiment, a 2D graphic is rendered for the curling event showing the top view of the curling rink. In another embodiment, a 2D graphic represents the perspective from a curling stone. In yet another embodiment, a 2D graphic represents the perspective from the center of a circular target ("house" in curling terminology). In one embodiment, the 2D graphic is displayed with live broadcasting within one screen. In another embodiment, the 2D graphic is displayed on a second screen. When a user clicks on the 2D graphic, the 3D coordinates of the clicked point are calculated by the server processor based on the 3D model; and the 3D coordinates are displayed at the clicked point on the 2D graphic. The server processor is further operable to calculate the center of the mass and 3D coordinates of the curling stone. In one embodiment, a velocity (including speed and direction) of a curling stone at its release is calculated and displayed on the 2D graphics. A path of a curling stone on the curling sheet is illustrated on the 2D graphics. The path of the curling stone can be a curl. The curl refers to a curling stone moving away from a straight line. In one embodiment, the biggest curl is illustrated on the 2D graphic, which is denoted by an angle with respect to the direction at its release. The velocities and the paths are displayed on the 2D graphic based on calculations within the 3D model by the server processor.

Statistical data related to the curling stone movement is also provided by the sever processor based on the rendered 3D model. The statistical data includes a distance between a curling stone and the center line, and a distance between the curling stone and the center of the circular target ("house" in curling terminology) in a curling event. Statistical data also includes a velocity ("weight" in curling terminology), a rotation ("turn" or "curl" in curling terminology), and a direction ("line" in curling terminology) of a curling stone at its initial release and while it is travelling on the curling sheet.

In one embodiment, the server processor comprises an intelligence engine. The intelligence engine includes rule sets for scoring in curling. In one embodiment, the intelligence engine is configured with artificial intelligence (AI) or machine learning algorithms for advanced analytics and predictions. For example, an intended path and endpoint of a curling stone is projected based on the past and current state of the curling stone considering the curling sheet condition and the brushing effect. Also for example, a collision is predicted based on a projected path. Machine learning algorithms are also used for training purposes. For example, what effective options and strategies there are in order to score most points, what an optimal throw looks like based on the number and positions of thrown stones on the curling sheet, etc. In one embodiment, the AI or machine learning algorithm is based on multiple sets of training data. The multiple sets of training data are a subset of historical data. Each of U.S. Pat. No. 9,922,286 titled "Detecting and Correcting Anomalies in Computer-Based Reasoning Systems" and U.S. application Ser. No. 15/900,398 is incorporated herein by reference in its entirety.

In one embodiment, the server processor is operable to store and access various data for advanced analytics, predictions and projections, for example but not for limitation, historical data related to curling events and curlers, environmental data for a live curling event, biometric data of the curlers, personal factors related to the curlers during a period before and after the live curling event, etc. Historical data includes scoring data, performance data, biometric data, and personal factors for the curlers during one or more historical events, and environmental data for the one or more historical events in one embodiment. Environmental data includes ice temperature, air temperature, humidity level, pebble condition, and other factors affecting the condition of the curling sheet. Examples of biometric data include weight, height, hydration, heart rate, fatigue, blood pressure, body temperature, blood sugar level, blood composition, alertness, etc. Personal factors also affect or have previously affected the performance of a curler. By way of example and not limitation, personal factors include family matters within a certain period before and/or after the live curling event, such as a wedding, a funeral, a birth of a child, etc.

In one embodiment, the systems and methods in the present invention are used for video enhancement with graphics and statistics. The enhanced videos are displayed on video walls and/or viewed on mobile devices. The systems and methods of the present invention also provide intelligence including advanced analytics, predictions and projections for broadcasting, coaching, betting and other purposes. Graphic User Interfaces (GUIs) and functions are customized for specific displaying instruments. For example, in TV broadcasting, a telestrator is operable to draw and mark over the graphics. Also for example, optimal throws, sweeping strategies and other strategy related data is provided and displayed to trainers and trainees.

FIG. 1 is a screenshot showing a camera view and a 2D graphic with a top view illustrating a collision in a curling event according to one embodiment of the present invention. The 2D graphic is on the right of the camera view of the curling event, both of which are shown in the same screen. The distance between the center of a stone No. 1 and the center line C of the curling sheet is −5 centimeters, which means stone No. 1 is on the left of the center line based on the camera view in FIG. 1. Line D goes through the center of the house and is vertical to center line C. The distance between the center of the stone No. 2 and line D, or the "vertical distance" between the center of stone No. 2 and the center of the house, is 203 centimeters. Line B is on the right side and in parallel of the center line C. Line Y represents the path of stone No. 2. A shaded area S between the center line C and the path of stone No. 2 line Y represents the area swept by the corresponding team (team Canada), denoted as area S.

Figure 2:
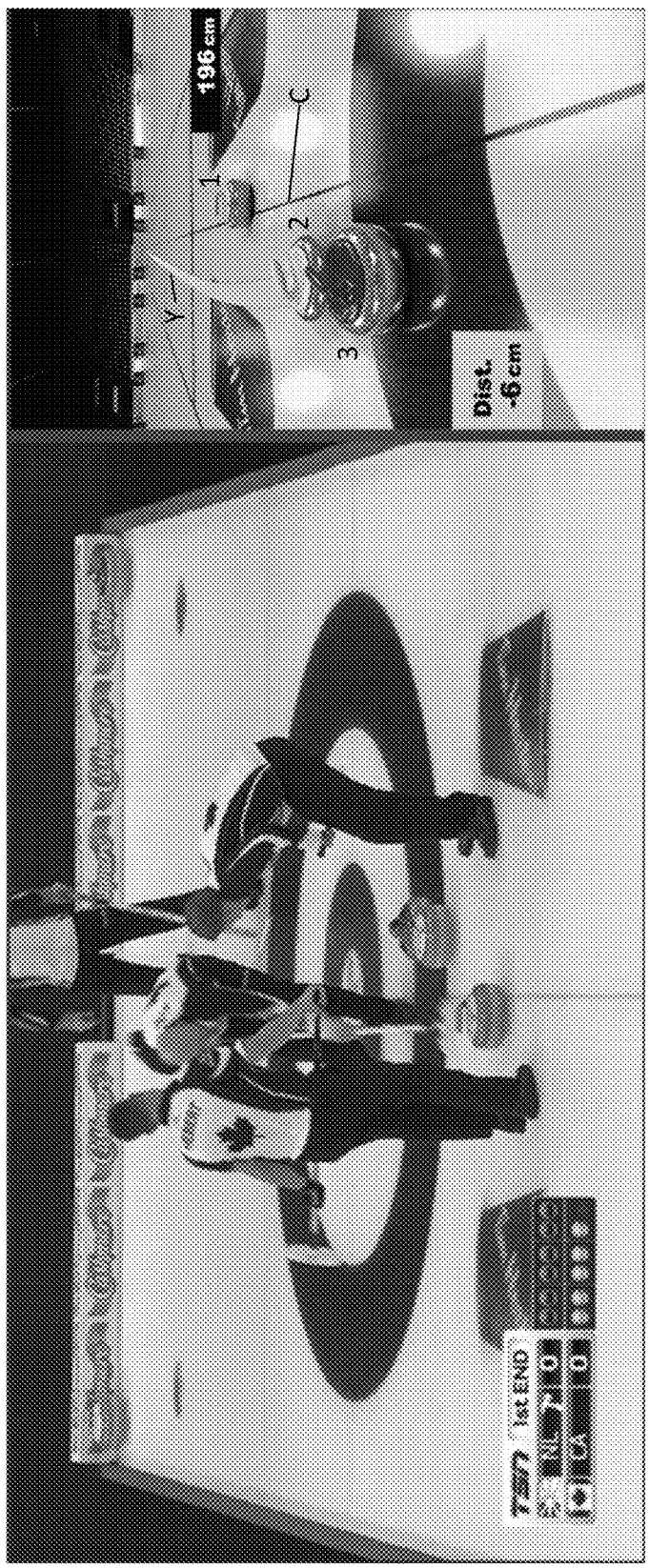
FIG. 2 is a screenshot showing a camera view and a 2D graphic with a perspective from the center of the house illustrating a collision in a curling event in one embodiment of the present invention.

FIG. 2 is a screenshot showing a camera view and a 2D graphic with a perspective from the center of the house illustrating a collision in a curling event in one embodiment of the present invention. The distance between stone No. 2 and line D (shown in FIG. 1) is 196 centimeters. Line D goes through the center of the house and is vertical to center line C.

Figure 3:
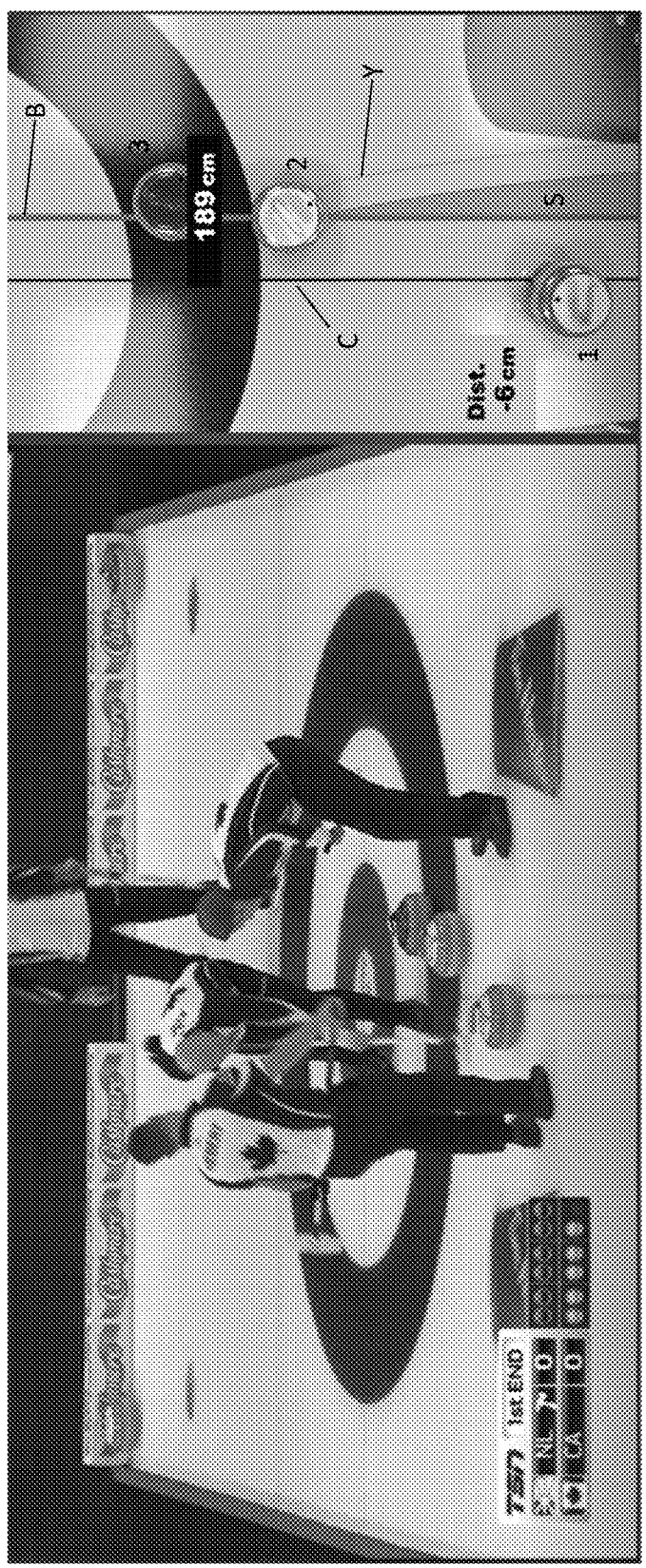
FIG. 3 is a screenshot showing a camera view and a 2D graphic with a top view after a collision in a curling event according to one embodiment of the present invention.

FIG. 3 is a screenshot showing a camera view and a 2D graphic with a top view after a collision in a curling event according to one embodiment of the present invention. The distance between the center of a stone No. 1 and the center line C of the curling sheet is −6 centimeters, which means stone No. 1 is on the left of the center line C based on the camera view in FIG. 3. The distance between stone No. 2 and line D (shown in FIG. 1) is 189 centimeters. Line D goes through the center of the house and is vertical to center line C. Line Y represents the path of stone No. 2. The shaded area S between line Y and line B is the swept area by the corresponding team (team Canada).

Figure 4:
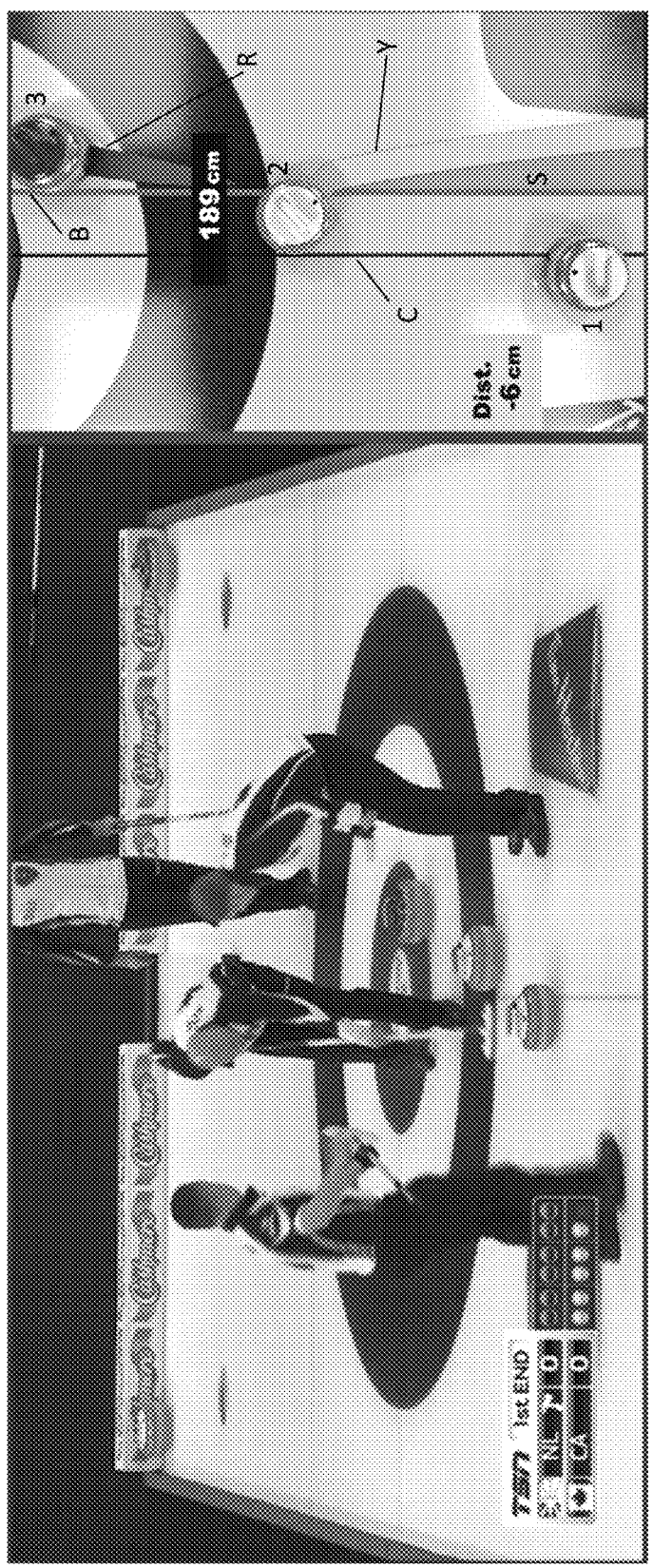
FIG. 4 is another screenshot showing a camera view and 2D graphic with a top view after a collision in a curling event according to one embodiment of the present invention.

FIG. 4 is a screenshot showing a camera view and 2D graphic with a top view after a collision in a curling event according to one embodiment of the present invention. The distance between the center of stone No. 1 and the center line C of the curling sheet is −6 centimeters, which means stone No. 1 is on the left of the center line C based on the camera view in FIG. 4. The distance between stone No. 2 and line D (shown in FIG. 1) is 189 centimeters. Line D goes through the center of the house and is vertical to center line C. Line Y represents the path of stone No. 2. The shaded area S between line Y and line B is the swept area by the corresponding team (team Canada). Line R represents the path of stone No. 3.

Figure 5:
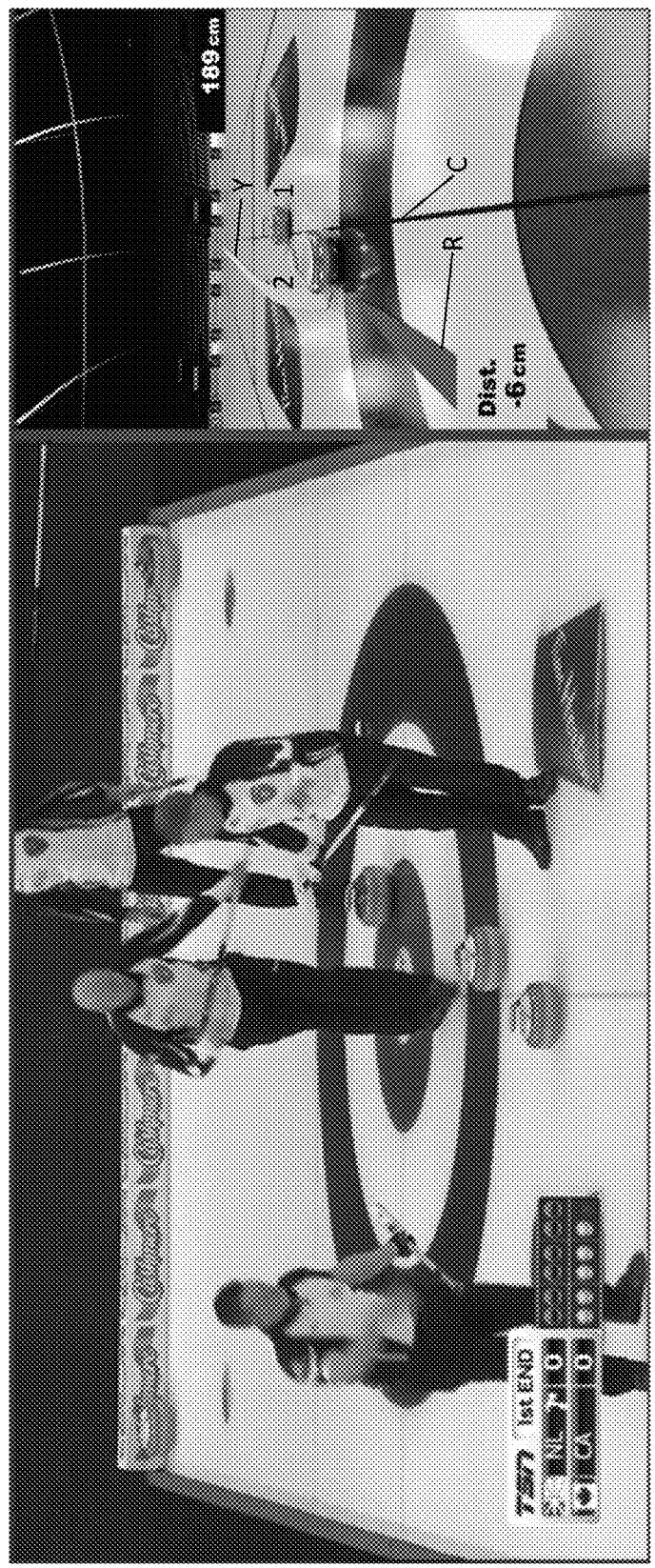
FIG. 5 is a screenshot showing a camera view and a 2D graphic with a perspective from the center of the house after a collision in a curling event according to one embodiment of the present invention.

FIG. 5 is a screenshot showing a camera view and a 2D graphic with a perspective from the center of the house after a collision in a curling event according to one embodiment of the present invention. The distance between stone No. 2 and line D (shown in FIG. 1) is 189 meters. Line D goes through the center of the house and is vertical to center line C. Line Y represents the path of stone No. 2. Line R represents the path of stone No. 3 from the opposite team.

Figure 6:
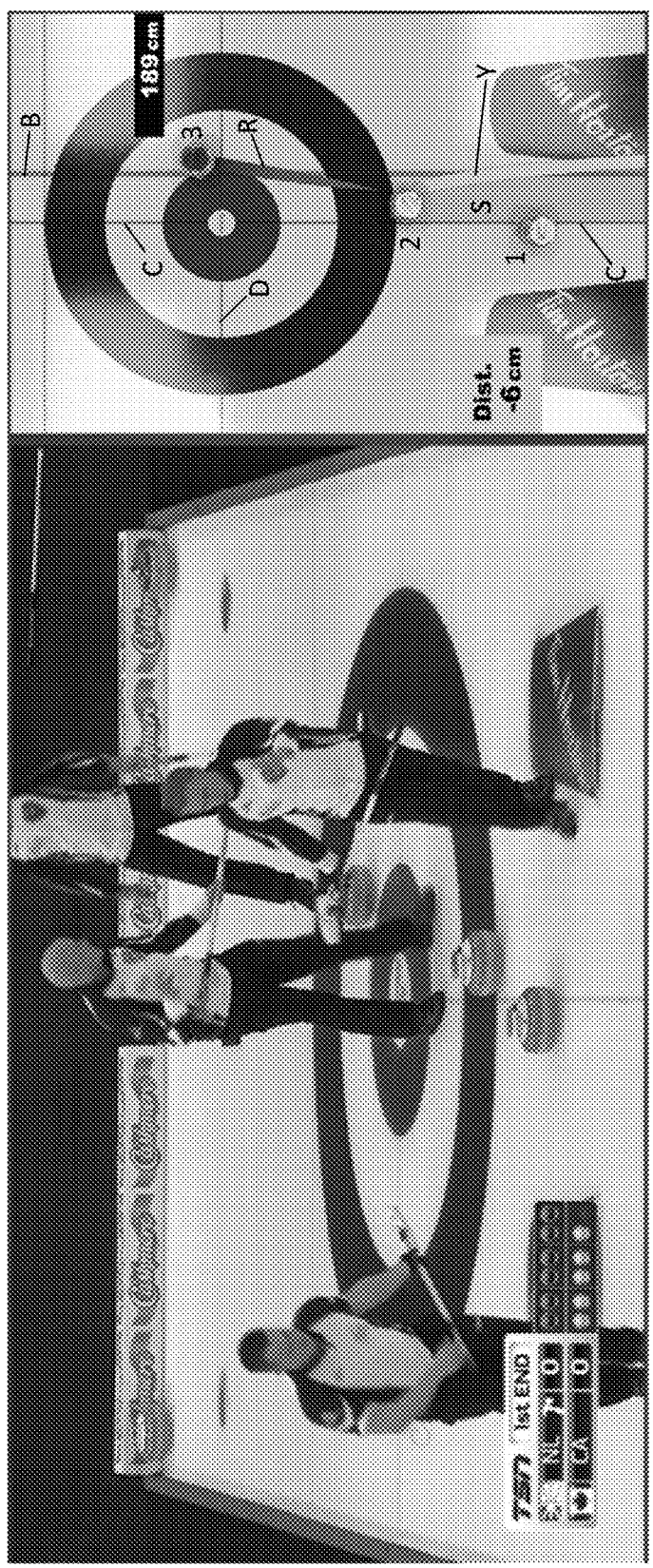
FIG. 6 is a screenshot showing a camera view and a 2D graphic with a top view after a collision in a curling event according to one embodiment of the present invention.

FIG. 6 is a screenshot showing a camera view and a 2D graphic with a top view after a collision in a curling event according to one embodiment of the present invention. The distance between the center of stone No. 1 and the center line C of the curling sheet is −6 centimeters, which means stone No. 1 is on the left of the center line C based on the camera view in FIG. 6. Line D goes through the center of the house and is vertical to center line C. The distance between stone No. 2 and line D is 189 centimeters. Line Y represents the path of stone No. 2. The shaded area between line Y and center line C is the area swept by the stone No. 2's team (team Canada). Line R represents the path of stone No. 3 from the opposite team.

Figure 7:
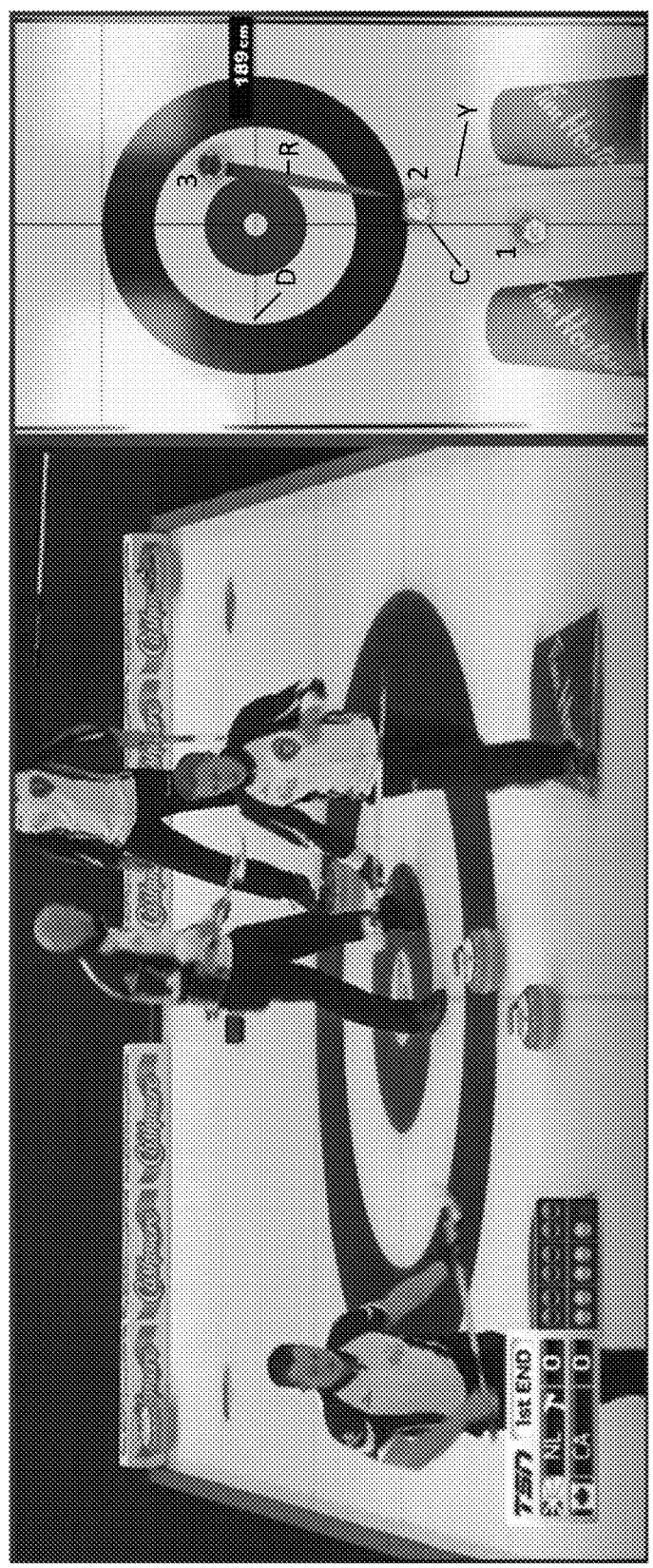
FIG. 7 is another screenshot showing a camera view and a 2D graphic with a top view after a collision in a curling event according to one embodiment of the present invention.

FIG. 7 is a screenshot showing a camera view and a 2D graphic with a top view after a collision in a curling event according to one embodiment of the present invention. The distance between the center of stone No. 1 and the center line C of the curling sheet is −6 centimeters, which means stone No. 1 is on the left of the center line C based on the camera view in FIG. 7. Line D goes through the center of the house and is vertical to center line C. The distance between stone No. 2 and line D is 189 centimeters. Line Y represents the path of stone No. 2. Line R represents the path of stone No. 3 from the opposite team.

FIGS. 1-7 illustrate the path of stone No. 2 before and after it hits stone No. 3. Notably, there is a curl on the path of stone No. 2 as a result of sweeping in order to hit stone No. 3. After hitting stone No. 3, stone No. 2 moved closer to the center line C. FIGS. 3-7 also illustrate the path of stone No. 3 after being hit by stone No. 2. The original position of stone No. 2 is in outer most ring area of the house. After being hit, stone No. 3 comes to rest in the middle ring area of the house.

FIGS. 8-13 illustrate the last stone on team Canada.

Figure 8:
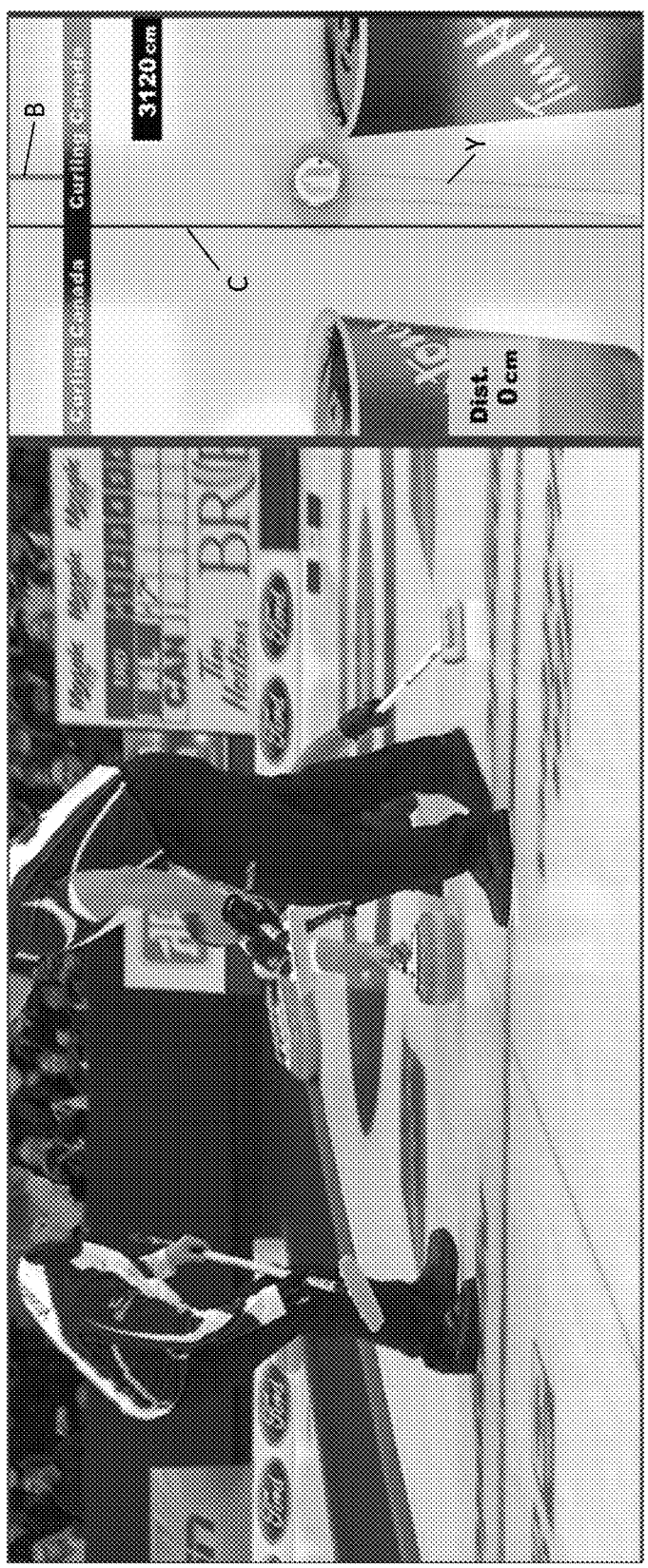
FIG. 8 is a screenshot showing a camera view and a 2D graphic with a top view after a throw in a curling event according to one embodiment of the present invention.

FIG. 8 is a screenshot showing a camera view and a 2D graphic with a top view after a throw in a curling event according to one embodiment of the present invention. The distance between the thrown stone and line D (shown in FIG. 1) is 3120 centimeters. Line D goes through the center of the house and is vertical to center line C. Line Y represents the path of the thrown stone. The stone is thrown on the center line C, and it shifts away from the center line C as it travels on the curling sheet.

Figure 9:
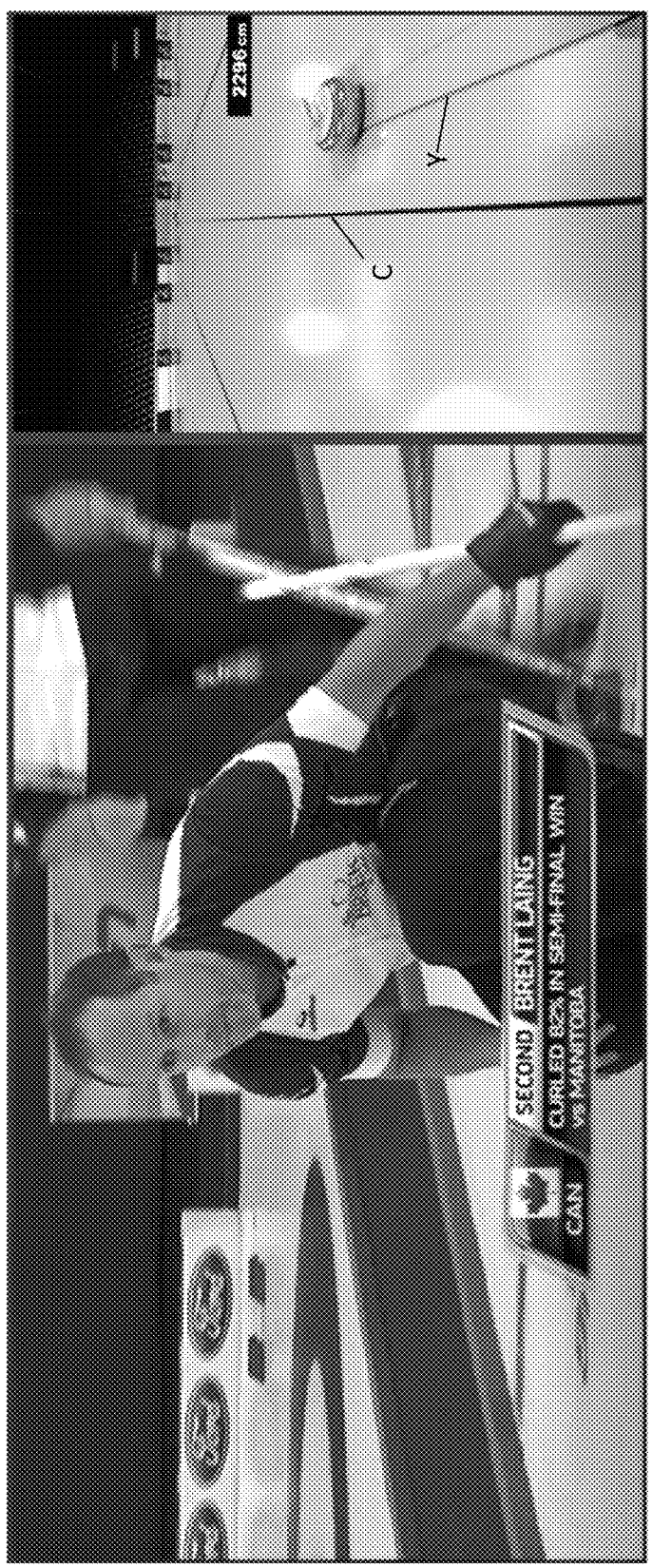
FIG. 9 is a screenshot showing a camera view and a 2D graphic from a perspective of a thrower after a throw in a curling event according to one embodiment of the present invention.

FIG. 9 is a screenshot showing a camera view and a 2D graphic from a perspective of a thrower after a throw in a curling event according to one embodiment of the present invention. The distance between the thrown stone and line D (shown in FIG. 1) is 2296 centimeters. Line D goes through the center of the house and is vertical to center line C. Line Y represents the path of the thrown stone.

Figure 10:
FIG. 10 is another screenshot showing a camera view and 2D graphic from a perspective of a thrower after the throw in a curling event according to one embodiment of the present invention.

FIG. 10 is another screenshot showing a camera view and 2D graphic from a perspective of a thrower after the throw in a curling event according to one embodiment of the present invention. The distance between the thrown stone and line D (shown in FIG. 1) is 1635 centimeters. Line D goes through the center of the house and is vertical to center line C. Line Y represents the path of the thrown stone. The distance between the center of the thrown stone and the center line C is 21 centimeters.

Figure 11:
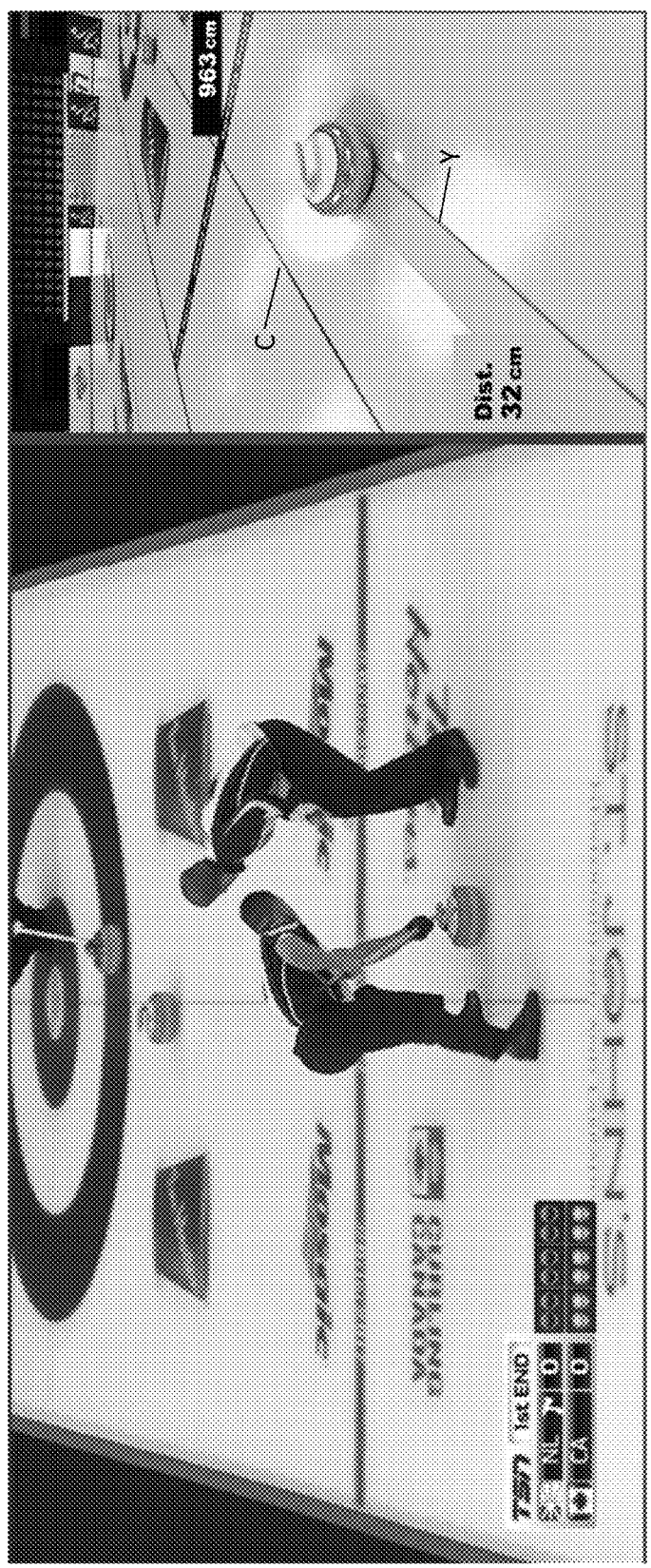
FIG. 11 is a screenshot showing a camera view and a 2D graphic according to one embodiment of the present invention.

FIG. 11 is a screenshot showing a camera view and a 2D graphic from a perspective according to one embodiment of the present invention. Line Y represents the path of the thrown stone. The distance between the thrown stone and line D (shown in FIG. 1) is 963 centimeters. Line D goes through the center of the house and is vertical to center line C. The distance between the center of the thrown stone and the center line C is 32 centimeters.

Figure 12:
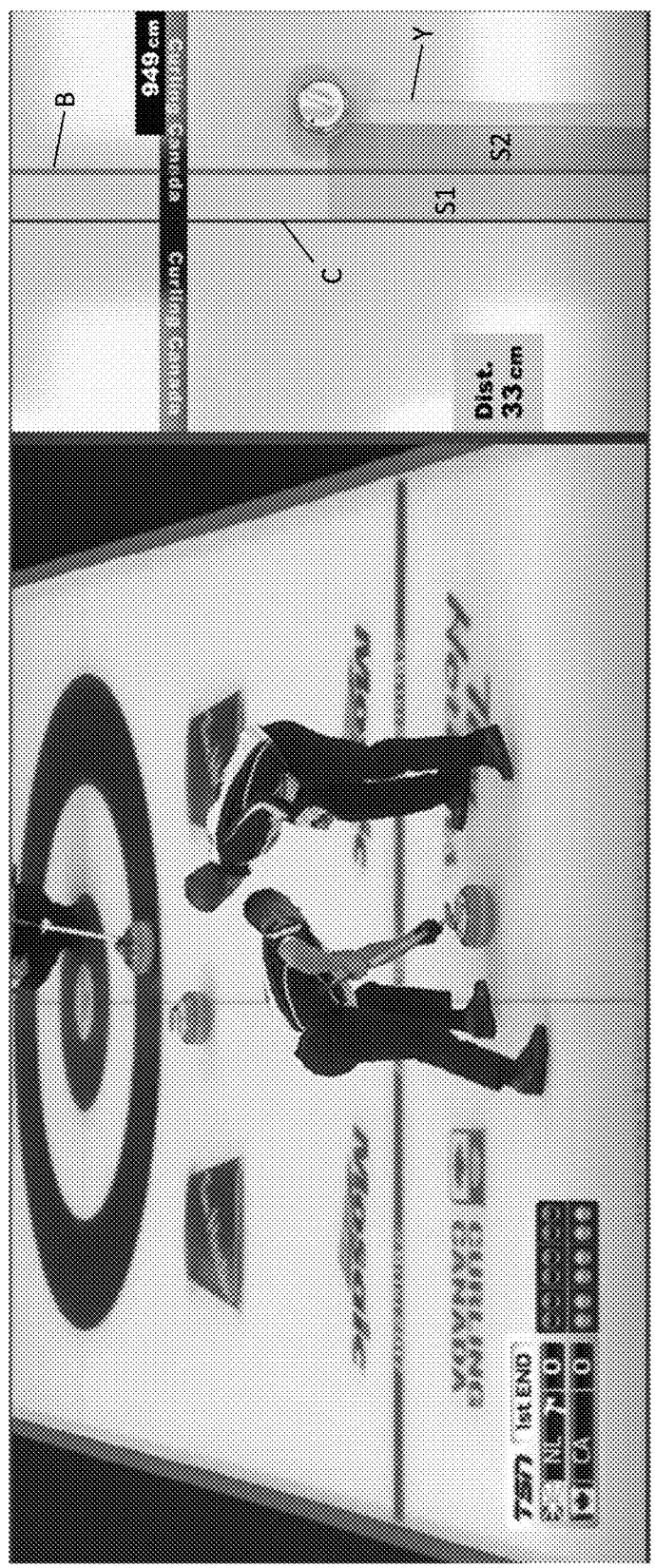
FIG. 12 is a screenshot showing a camera view and a 2D graphic with a top view after a throw in a curling event according to one embodiment of the present invention.

FIG. 12 is a screenshot showing a camera view and a 2D graphic with a top view after a throw in a curling event according to one embodiment of the present invention. The distance between the thrown stone and line D (shown in FIG. 1) is 949 centimeters. Line D goes through the center of the house and is vertical to center line C. Line Y represents the path of the thrown stone. The distance between the center of the thrown stone and the center line C is 33 centimeters. The shaded area between the center line C and the path of the thrown stone line Y represents the swept area.

Figure 13:
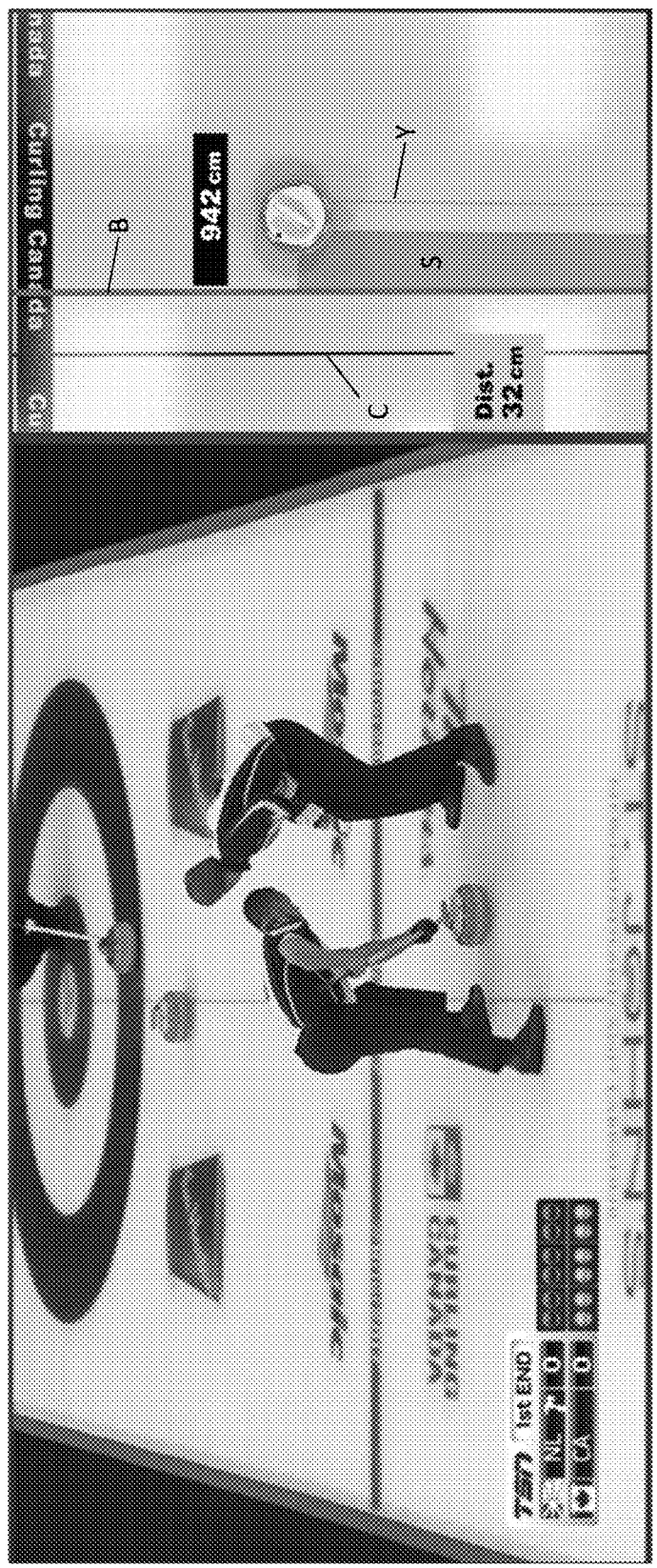
FIG. 13 is another screenshot showing a 2D graphic after a throw in a curling event according to one embodiment of the present invention.

FIG. 13 is another screenshot showing a 2D graphic with a top view after a throw in a curling event according to one embodiment of the present invention. The distance between the thrown stone and line D (shown in FIG. 1) is 942 centimeters. Line D goes through the center of the house and is vertical to center line C. Line Y represents the path of the thrown stone. The distance between the center of the thrown stone and the center line C is 32 centimeters. The shaded area between line B and the path of the thrown stone line Y represents the area swept by the corresponding team (team Canada).

Figure 14:
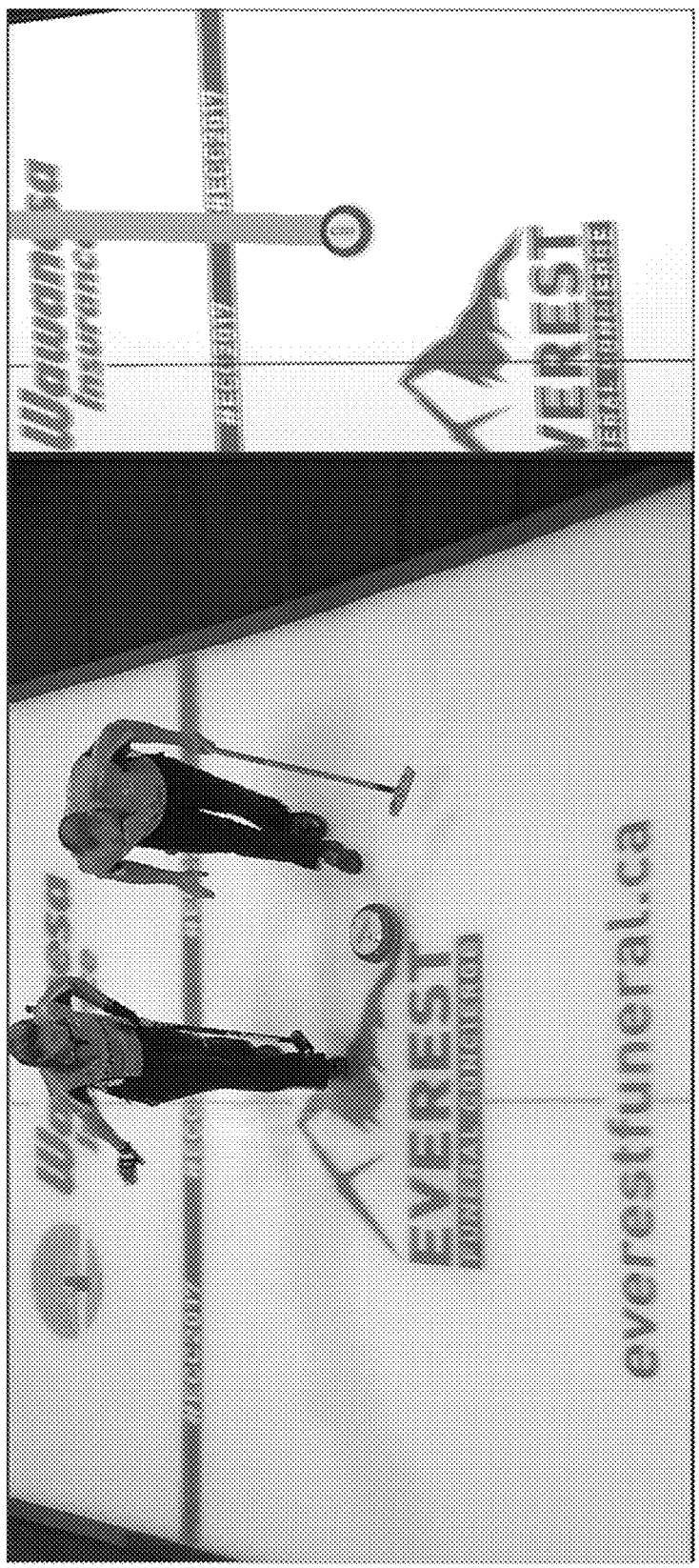
FIG. 14 is a screenshot showing 2D graphics with a top view illustrating the path of a stone in a curling event according to one embodiment of the present invention.
Figure 15:
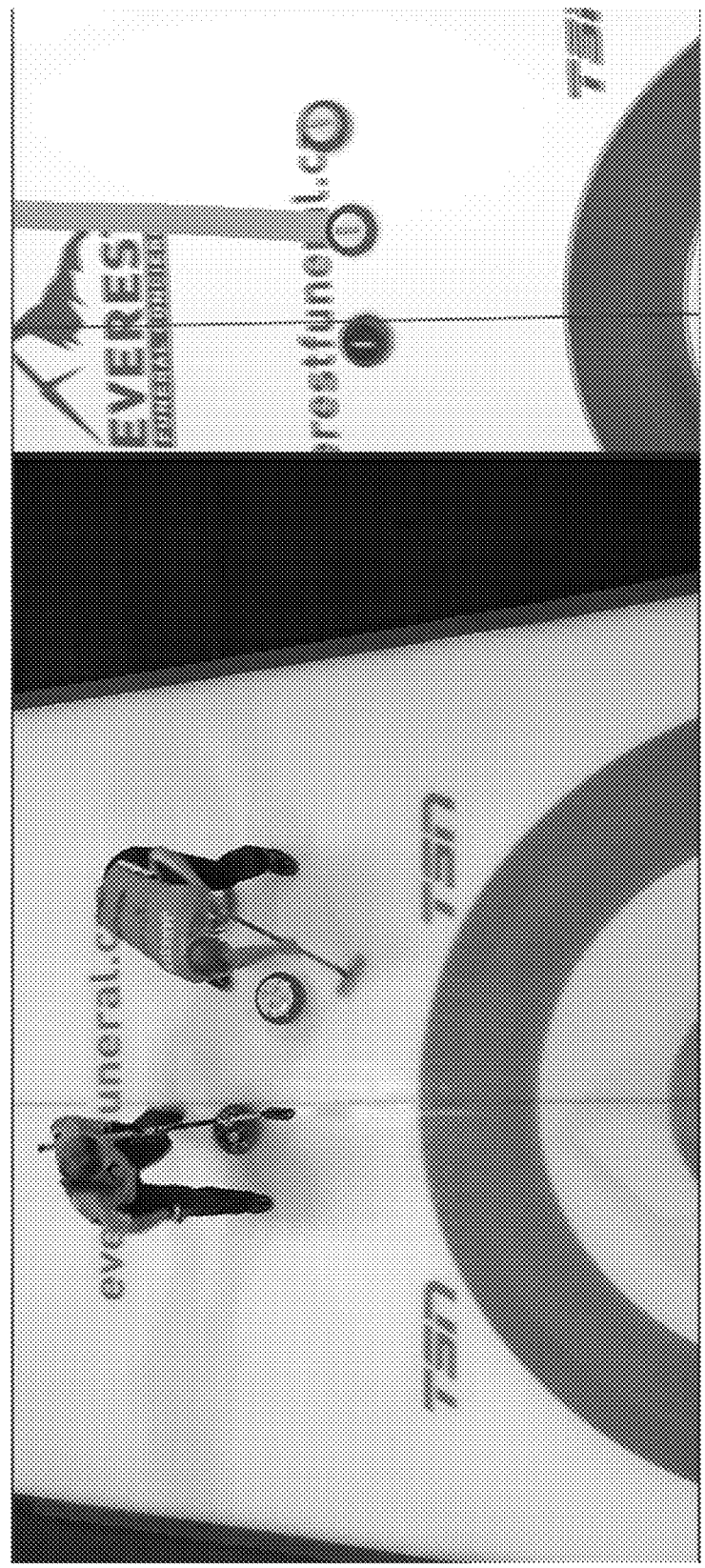
FIG. 15 is another screenshot showing 2D graphics with a top view illustrating the path of a stone in a curling event according to one embodiment of the present invention.
Figure 16:
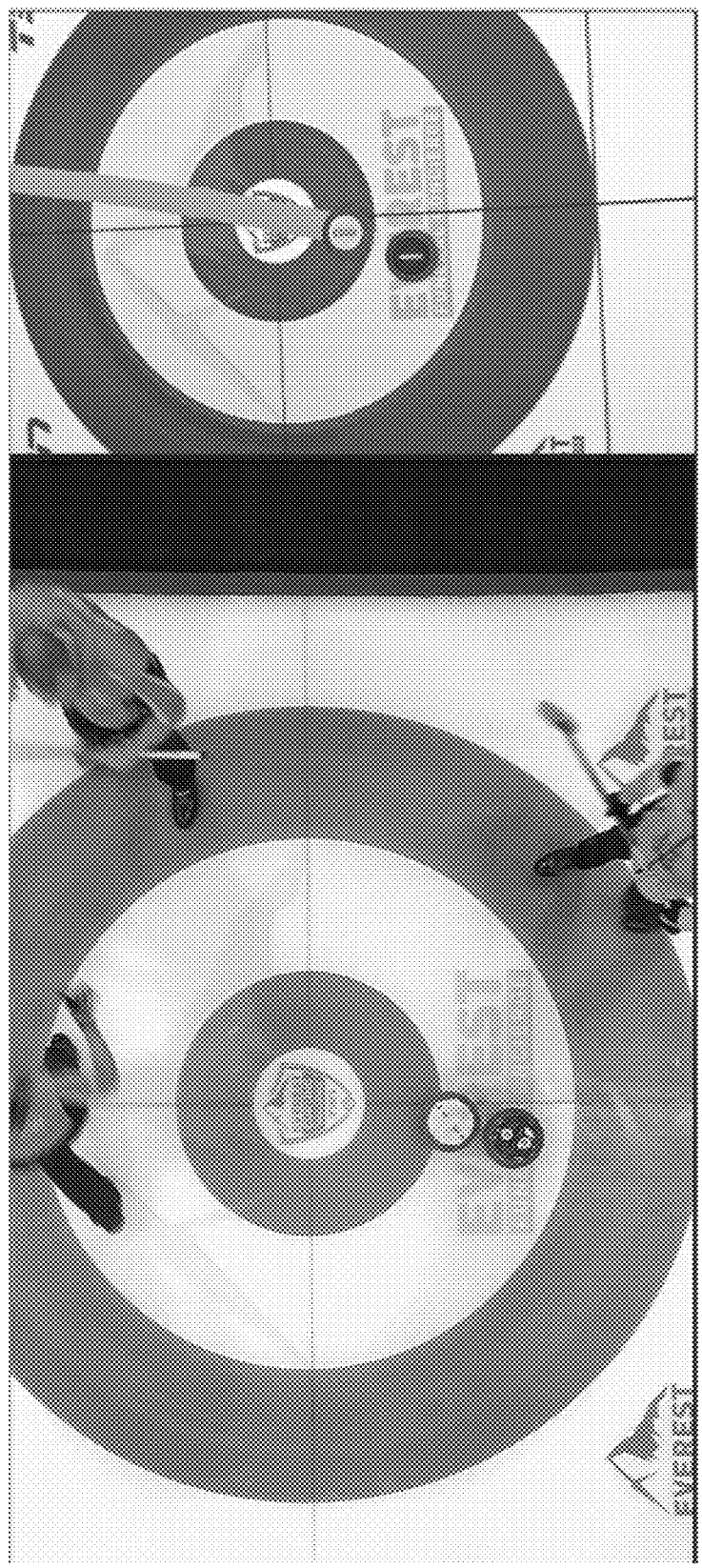
FIG. 16 is another screenshot showing 2D graphics with a top view illustrating the path of a stone in a curling event according to one embodiment of the present invention.

FIGS. 14-16 are screenshots showing 2D graphics with a top view illustrating the path of a stone in a curling event according to one embodiment of the present invention.

Another existing problem in the sports broadcast and analytics until the time of the present invention is that there is no standard format across multiple sports for a file representing object movement in space over a timeline. 2D video feeds from tracking cameras have individual objects within them, but there are no synchronized timelines. In the present invention provides a standard file format for recording object movement during a play along a timeline, which is compatible for multiple sports. This file format is much smaller than a video format, and is annotatable. In one embodiment, the file format is named as .most (multi-object synchronized timeline). In another embodiment, the file format is named as .smt (synchronized multi-object timeline).

The present invention is applicable in other sports besides curling, such as football, basketball, and baseball, for object tracking including ball tracking and player tracking. In one embodiment, the systems and methods of the present invention are used in football tracking and football player tracking in a football game. Video representations for movements of independent objects in space over time are extracted from a 3D model, which is created based on 2D video feeds from tracking cameras, and a .most or .smt file is extracted to show how each player moved during a drill or a game. The performance of the players in the drill or the game can be compared with how they should have performed according to developed strategies.

Figure 17:
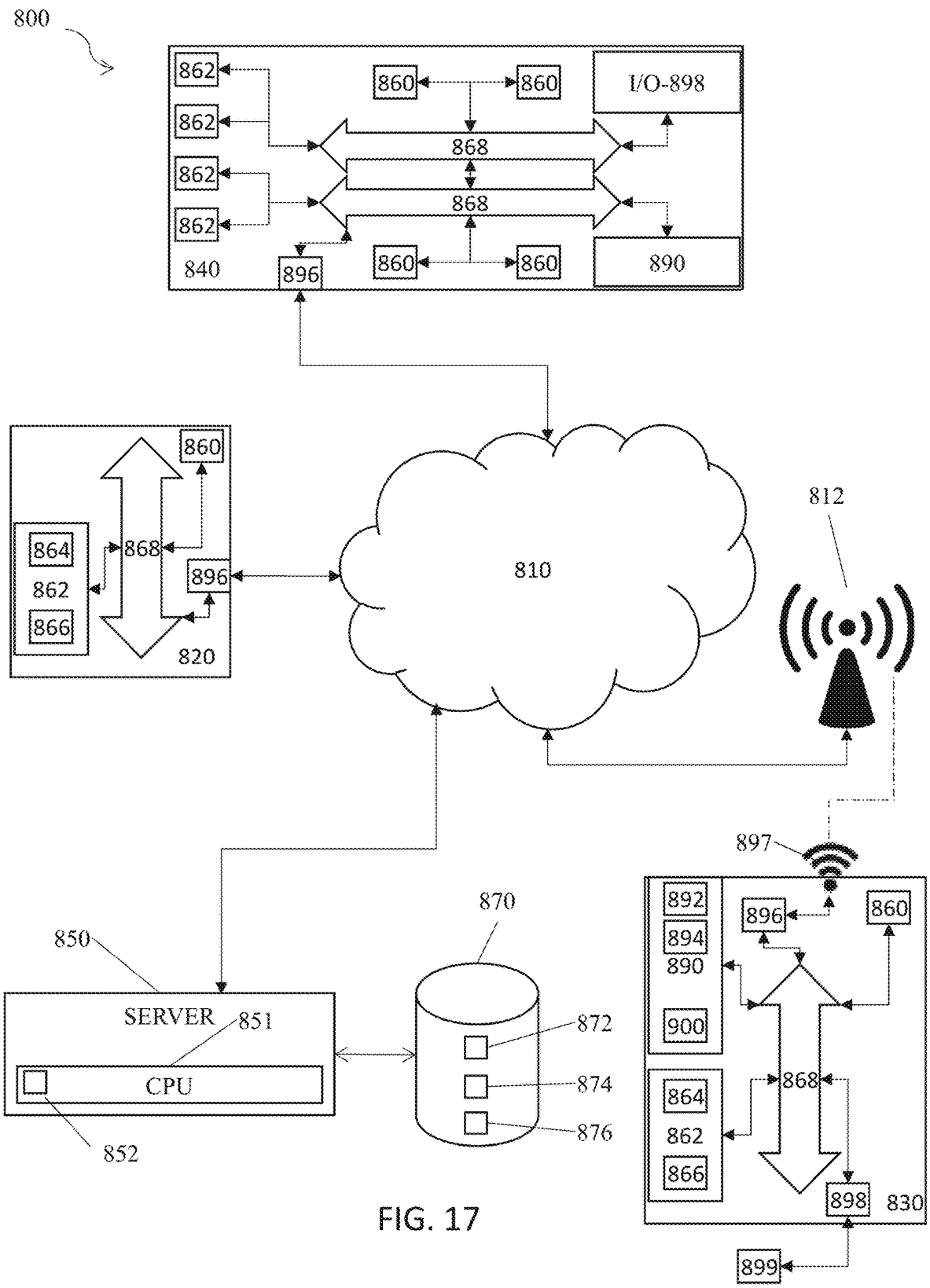
FIG. 17 is a schematic diagram of a cloud-based system of the present invention according to one embodiment of the present invention.

FIG. 17 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 17, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

It is also contemplated that the computer system 800 may not include all of the components shown in FIG. 17, may include other components that are not explicitly shown in FIG. 17, or may utilize an architecture completely different than that shown in FIG. 17. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for video presentation and analytics of a live sporting event, comprising:
   a server platform in network communication with at least two cameras and at least one display device;
   wherein the server platform is operable to receive video data from the at least two cameras, wherein the video data includes video of at least one object in the live sporting event;
   wherein the server platform is operable to render a three-dimensional (3D) world model comprising the at least one object in the live sporting event based on the video data;
   wherein the server platform is operable to generate at least one graphic illustrating the at least one object based on the 3D world model;
   wherein the at least one display device is operable to display the at least one graphic via a graphical user interface (GUI);
   wherein the server platform is operable to determine a speed and a direction of the at least one object and display the speed and the direction of the at least one object on the at least one graphic;
   wherein the server platform is operable to predict a collision between the at least one object and at least one other object; and
   wherein the server platform is operable to display a path of the at least one other object on the at least one graphic as a result of the collision.

2. The system of claim 1, wherein the server platform is operable to provide analytics, projections, and/or predictions at least based on the video data.

3. The system of claim 2, wherein the analytics, projections, and/or predictions are further based on environmental data, wherein the environmental data comprises air temperature and/or humidity level.

4. The system of claim 2, wherein the analytics, projections, and/or predictions are further based on biometric data, wherein the biometric data comprises weight, height, hydration, heart rate, fatigue, blood pressure, body temperature, blood sugar level, blood composition, and/or alertness.

5. A method for video presentation and analytics of a live sporting event, comprising:
   a server platform receiving video data including at least one object from at least two cameras;
   the server platform rendering a three-dimensional (3D) world model including the at least one object based on the video data;
   the server platform generating at least one graphic illustrating the at least one object based on the 3D world model;
   the server platform providing analytics, projections, and/or predictions based on the video data and environmental data; and at least one display device displaying the at least one graphic via an interactive graphical user interface (GUI);

the server platform predicting a collision between the at least one object and at least one other object; and the server platform displaying a path of the at least one other object on the at least one graphic as a result of the collision.

6. The method of claim 5, wherein the analytics, projections, and/or predictions are further based on biometric data, wherein the biometric data comprises weight, height, hydration, heart rate, fatigue, blood pressure, body temperature, blood sugar level, blood composition, and/or alertness.

7. The method of claim 5, wherein the environmental data comprises air temperature and/or humidity level.

8. The method of claim 5, wherein the video data is two-dimensional (2D) video data.

9. The method of claim 5, wherein an origin of the 3D world model is a center of a venue of the live sporting event.

10. The method of claim 5, further comprising the at least one display device displaying statistical data on the at least one graphic, wherein the statistical data comprises a velocity of the at least one object, a rotation of the at least one object, and/or a direction of the at least one object.

11. A system for video presentation and analytics of a live sporting event, comprising:

a server platform in network communication with at least two cameras and at least one display device;

wherein the server platform is operable to receive video data from the at least two cameras, wherein the video data includes video of at least one object in the live sporting event;

wherein the server platform is operable to render a three-dimensional (3D) world model comprising the at least one object in the live sporting event based on the video data;

wherein the server platform is operable to generate at least one graphic illustrating the at least one object based on the 3D world model;

wherein the at least one display device is operable to display the at least one graphic via a graphical user interface (GUI);

wherein the server platform is operable to predict a collision between the at least one object and at least one other object; and wherein the server platform is operable to display a path of the at least one other object on the at least one graphic as a result of the collision.

12. The system of claim 11, wherein the video data is two-dimensional (2D) video data.

13. The system of claim 11, wherein the server platform comprises an intelligence engine including rules sets for the live sporting event, and wherein the intelligence engine is configured with an artificial intelligence algorithm.

14. The system of claim 11, wherein the server platform is operable to provide analytics, projections, and/or predictions at least based on the video data.

15. The system of claim 14, wherein the analytics, projections, and/or predictions are further based on environmental data, wherein the environmental data comprises air temperature and/or humidity level.

16. The system of claim 14, wherein the analytics, projections, and/or predictions are further based on biometric data, wherein the biometric data comprises weight, height, hydration, heart rate, fatigue, blood pressure, body temperature, blood sugar level, blood composition, and/or alertness.

17. The system of claim 11, wherein the server platform is further operable to project a path of the at least one object.

18. The system of claim 11, wherein an origin of the 3D world model is a center of a venue of the live sporting event.

19. The system of claim 11, wherein the server platform is further operable to project an end position of the at least one object.

* * * * *